Patented Feb. 28, 1950

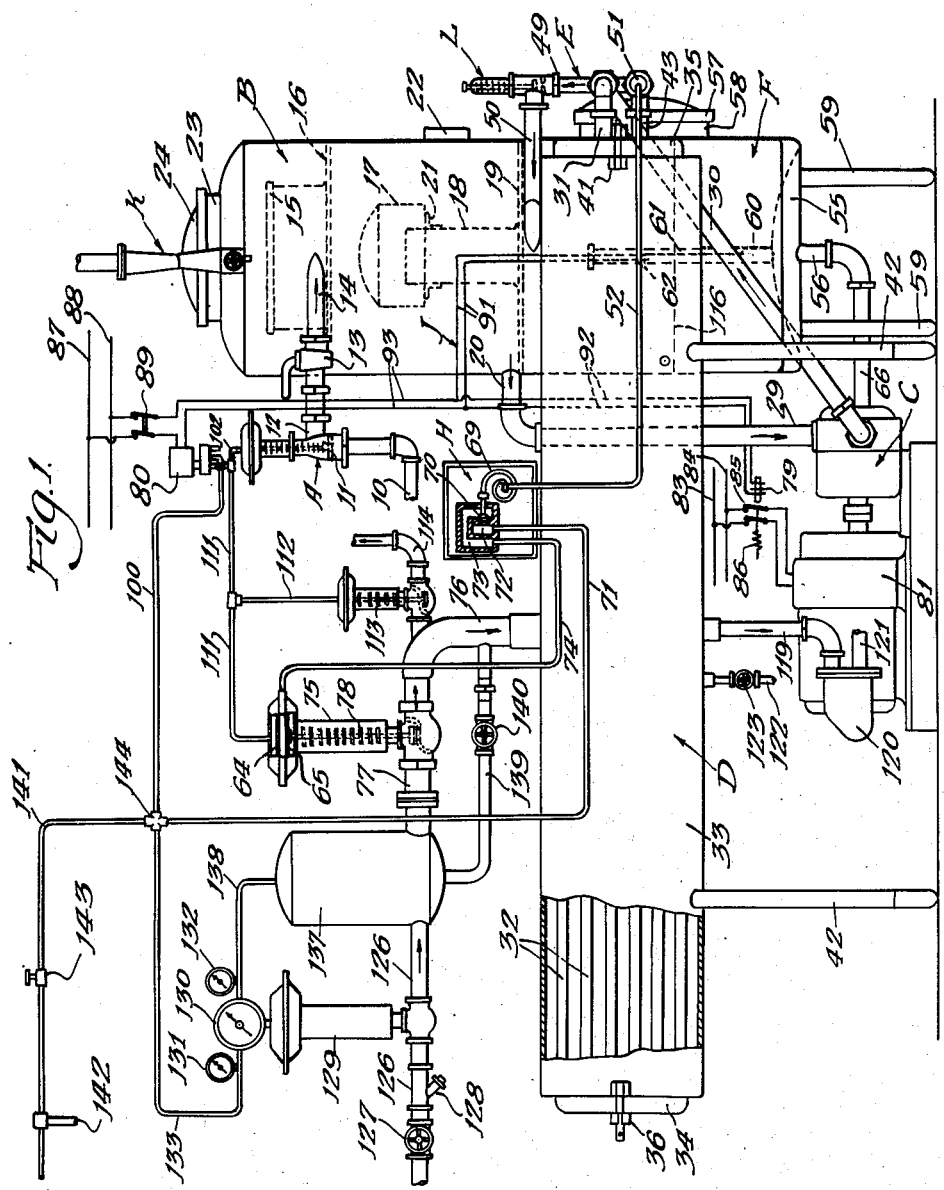

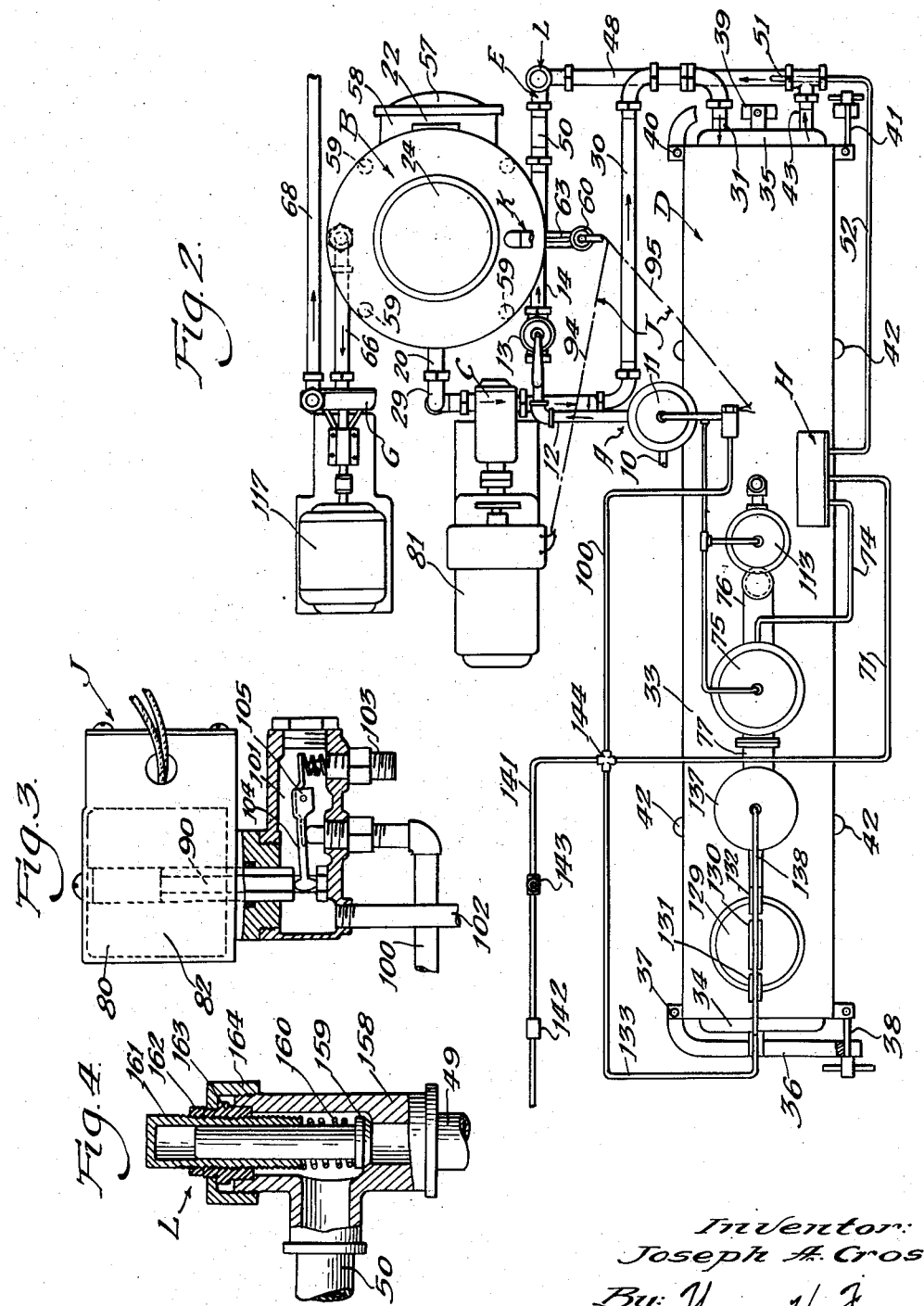

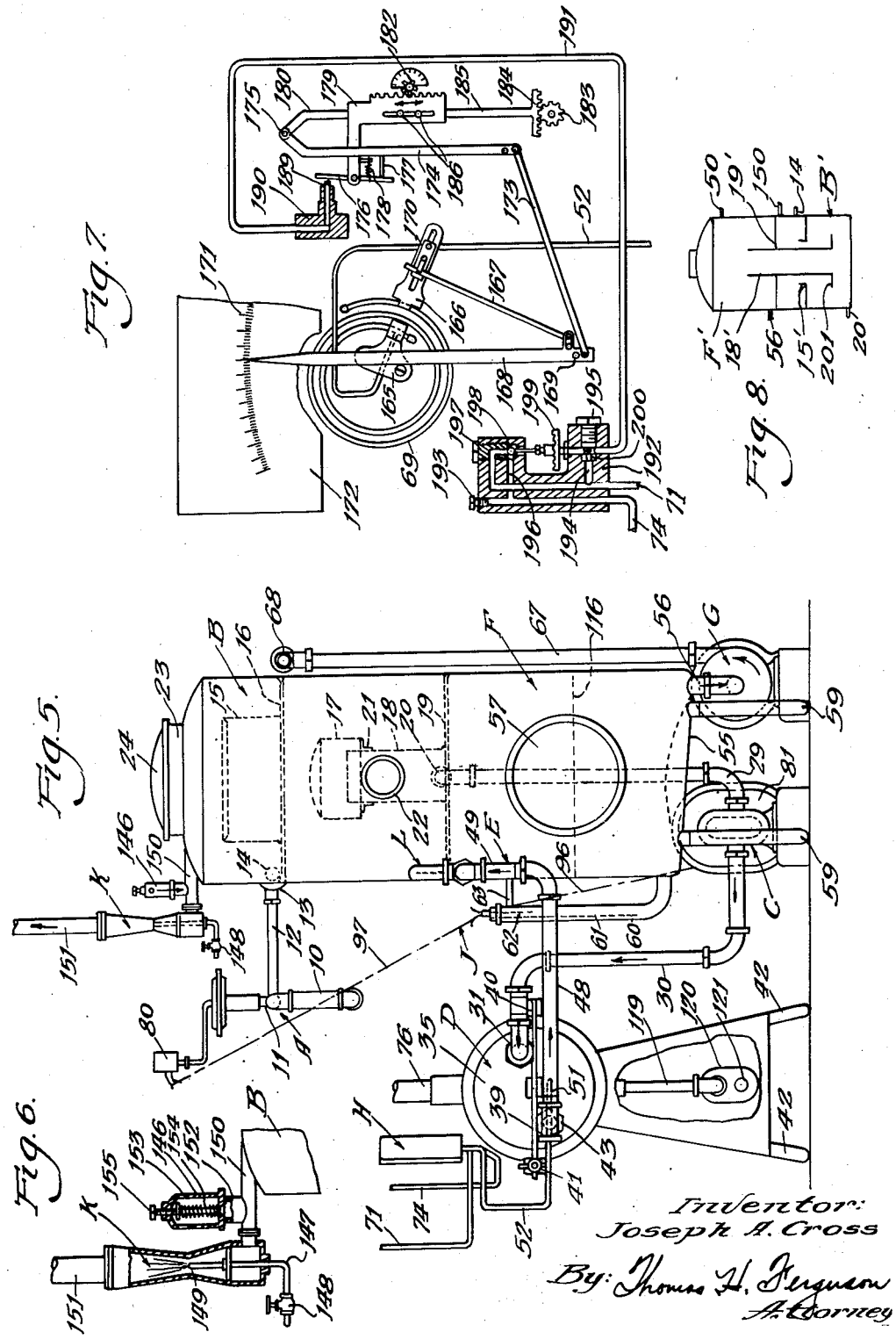

2,498,836

UNITED STATES PATENT OFFICE 2,498,836

APPARATUS USED IN THE PROCESSING OF FRUIT AND VEGETABLE JUICES AND THE LIKE

Joseph A. Cross, Westerville, Ohio, assignor to Mojonnier Bros. Co., a corporation of Illinois Application May 11, 1945, Serial No. 593,141

17 Claims. (Cl. 99—252)

The present invention relates to apparatus used in the processing of fruit and vegetable juices and like liquids, and has to do more particularly with high temperature quick processing. The various liquids to which it is applicable include grapefruit juice, orange juice, blended orange and grapefruit juice, various other citrus fruit juices, apple juice, tomato juice and other vegetable and fruit juices and the like.

A distinct feature of the invention is the utilization of the liquid itself to condense. In the prior art, it is customary to condense or cool by the use of water. By the use of the present invention, the liquid being treated takes the place of water.

Another feature resides in a large saving in steam, due to the preheating of the liquid as it passes through the apparatus. Since in the operation the liquid replaces water, there is also a large saving over the prior art in the use of water. Not so much water needs to be pumped. This also results in a saving of the equipment, since smaller equipment can do the work.

Another feature is found in the deaeration of the liquid as it passes through the equipment.

The invention involves the use of a heat exchanger or pasteurizer of the tubular type which overcomes the many objections to the use of the plate type device. Thus, in my equipment, the use of gaskets is reduced to a bare minimum and therefore becomes no longer a factor of importance. This is in decided contrast to the plate type pasteurizer which employs a large number of gaskets.

These several features and advantages will be apparent and better understood upon reference to the following detailed description taken in connection with the accompanying drawings, which illustrate a preferred form of apparatus constructed and arranged in accordance with the invention, while the scope of the invention will be particularly pointed out in the appended claims.

This case covers the apparatus used in treating the liquid substance, and application Serial No. 749,543, filed May 21, 1947, which is a division of this case, covers the method or process employed in so doing.

In said drawings—

Fig. 1 is a side elevation, largely in diagram, of the apparatus or equipment employed in carrying out the invention;

Fig. 2 is a plan view of a portion of the same;

Fig. 3 is a detail view, partially in vertical section, of a solenoid valve employed in the controls;

Fig. 4 is a similar view of the relief valve;

Fig. 5 is an end view of a portion of the equipment;

Fig. 6 is a detail view, also in partial vertical section, illustrating the eductor and its associated relief valve;

Fig. 7 is a detail diagram of the temperature control mechanism; and

Fig. 8 is a thumbnail sketch of a reversal of parts, the condenser being below and the separating chamber above, the same being in vertical section.

Throughout these views, like characters refer to like parts.

Briefly stated, the equipment comprises inlet connections A by which the liquid to be treated, herein described as tomato juice, is controlled in its flow into a vacuum pan type of condenser B. There it takes up heat from the vapors of the previously treated juice, as we shall presently see. Then by a force pump C it is forced into a flash heat exchanger or pasteurizer D, and upon emerging therefrom, it is carried by connections E into a second, a collecting chamber F, where it flashes back into the state of juice and vapor, by reason of the large volume of the chamber and the high temperature of the juice, and its vapors pass upward into the condenser B and its liquid drops to the bottom of the chamber F where it is collected and passed onto the filler (not shown) by means of a discharge pump G and its connections. Controls H regulate the heat supplied to the exchanger in accordance with the temperature of juice at the outlet of the exchanger D. Other mechanisms are operated by electro-pneumatic controls J in response to variations of the juice level in the collector F. An eductor K and an associated valve maintain a proper degree of vacuum in the condenser B and collecting chamber F which, in the present instance, are united in the form of a vacuum pan. A relief valve L maintains a proper high pressure of the juice in the conduit connections E until it is ready to be freed into the chamber F, where it expands rapidly with corresponding rapid evaporation.

In treating tomato juice, it is purposed to heat it up to, say, 260° Fahr. and then cool it down to, say, 200° Fahr. for canning. Accordingly, when treating tomato juice, the valve L is set to operate at 260°. It is noted that where tomato juice is in question, it is not necessary to have a deoiler, as would be the case with citrus juices.

The effect upon tomato juice at 70° Fahr. is first to increase it to 130° Fahr. in its passage through the condenser B, then increase its temperature from 130° Fahr. by flash heating in the heat exchanger D, and then expand and cool the resulting mixture down to 200° Fahr. in the collecting chamber F. At this temperature it is suitable for canning.

Using these temperatures and the equipment illustrated, it is possible to feed the juice at the rate of 40 gallons per minute. This amounts to 2400 gallons per hour, or in weight, a single gallon weighing 8⅓ pounds, 20,000 pounds per hour. The condensation of 1200 pounds of vapor per hour will release enough latent heat to increase the temperature of the entering juice about 60° Fahr.; that is, from 70° Fahr. to 130° Fahr. The tubular heat exchanger may be variously constructed. I have found that an exchanger of ordinary construction having tubes 10 feet long, 1 inch outside diameter, 32 in number, 4 tubes per pass, will give the required additional heat of 130° Fahr. in about 15 seconds of time, when proper heat is supplied to the exchanger. Thus the juice will be increased to about 260° Fahr. in about 15 seconds. For this work, it will require about 3,000 pounds of steam per hour and a temperature of about 280° Fahr. at a pressure of 35 pounds. The regulator L will be set at about 20 pounds and the capacity of the chamber E will be sufficient to reduce the pressure to about 3 pounds absolute, or 6 inches of vacuum, namely, that which is obtained in the chamber B—F by the eductor K and its associated valve. The result will be the giving up of the liquid at about 200° Fahr., the canning temperature.

Having given this preliminary view of the method and operating equipment, we may now pass to a more detailed description.

The inlet connections A may be of any suitable design. Thus, in the particular instance shown, they include an inlet pipe 10, leading to the inlet of a diaphragm control valve 11. From the outlet of this valve, a pipe 12 leads to a hand-operated valve 13 and a short piece of pipe 14 to the chamber B, which it enters tangentially.

The chamber B, which, when combined with the chamber F, constitutes a vacuum chamber B—F, is provided on its interior with a circular weir 15, surrounded by a peripheral channel 16 into which the juice is forced from the tangential pipe 14, and as the channel 16 is filled, the juice cascades over the upper edge of the weir, which constitutes a spillway, down upon the hood 17 which overlies the open end of a pipe 18 extending upward from a center apertured diaphragm 19 which closes off the chamber B at a point slightly below the outlet 20. The hood 17 is supported by any suitable means, as by the brackets 21, upon the pipe 18 extending outward into engagement with the upper wall of the hood 17. This construction brings the juice, which cascades downward, into contact with the vapors which pass upward through the pipe 18. The weir and its spillway may be variously formed. It is only necessary that the spillway be constructed so as to fan out the juice as it passes along. The centrally apertured diaphragm 19 constitutes a partition which divides the chamber B—F into two parts, a condensing part B and a collecting and separating part F. In other words, an upper condensing portion and a lower vapor-separating portion.

The side of the chamber B is provided with a covered hand hole 22, and upon its top is a manhole formed with a vertical flange 23 and a cover 24.

From the condenser B, juice at about 130° Fahr. passes down through pipe 29 and suitable connections into the force pump C which has its outlet connected by pipe 30 and suitable connections to the inlet 31 of the tubular heat exchanger D. As before stated, the juice is flash pasteurized or heated to 260° Fahr. in its passage through this exchanger.

The heat exchanger D is of well known construction and comprises a nest of tubes 32 located in an outer shell 33. At its ends the shell has heads 34 and 35 which are provided with passages in a well known manner to conduct the juice from one set of tubes to another in its passage through the heat exchanger. The head 34 is secured to a pivotally mounted lever 36 pivoted at 37 and secured in position by a swinging screw bolt 38 in a well known manner. Similarly, the head 35 is secured to an arm 39 pivoted at 40 and secured by a swinging bolt 41. These heads are to be opened when it is necessary to clean out the exchanger. Suitable legs 42 support the exchanger. The outlet 43 of the pipe system connects onto the pipe connections E which run to the collector F.

These connections E include a horizontal pipe 48 and a vertical pipe 49 and a second horizontal pipe 50 leading into the collector F in a tangential direction. In one end of the pipe 48, is located, as part of the control system, a temperature actuated bulb 51, which is connected by a tube 52 to the control mechanism H, hereinafter described. The vertical pipe 49 has connected to it the relief valve L which is set to allow juices to build up to 260° Fahr. before being released into the interior of the chamber F.

The collector F, which forms the lower portion of the combined vacuum pan type of chamber B—F, receives the outlet from the pipe 50 at a point just below the diaphragm 19. Here it will be noted that at a point just above the diaphragm 19 the preheated juice was conveyed through the outlet pipe 20. This collecting chamber F is provided with an inclined bottom 55 to drain the contents to an outlet pipe 56. It is provided with a manhole having a cover 57 resting upon a peripheral flange 58 formed upon the side wall of the chamber. Beneath the bottom 55 are four legs 59 by which the chamber B—F is supported. In addition, there is a level indicating pipe 60 which extends horizontally outward from the bottom of the chamber and upward along one side. Into its top is inserted a couple of electrodes, a long one 61, and a short one 62. An electric circuit is completed between these two electrodes for control purposes, as hereinafter explained. The bracket 63 supports the upper end of the pipe 60.

When the juice and its vapors are separated in the chamber F, the juice passes through the outlet 56 to the discharge pump G by way of a pipe connection 66. This is a centrifugal pump which operates to force the juice through the pipes 67, 68, and on to the canning machine.

In the control of the temperature of the juice, it is preferable to control the same by an expansible bulb located adjacent to the outlet of the heat exchanger. The bulb 51 and its tubular connection will serve this purpose. The end of the tube 52 connects with the Bourdon tube of the control mechanism H. At first, it will be sufficient to describe the mechanism shown in Fig. 1, which is not the actual mechanism used, but represents the mechanism of Fig. 7, which is preferably the exact mechanism used, the mechanism of Fig. 1 not giving the nicety of adjustment which the mechanism of Fig. 7 will perform. The Bourdon tube 69 is secured at one end and allowed to expand and contract under the action of the fluid in the tube 52 to close and open the valve 70 in a well known manner. When the valve 70 is closed, the supply of compressed air through tube 71 passes into the chamber 72 and no further. When the valve 70 is open, then air escapes into the chamber 73 and thence through pipe 74 to the double diaphragm valve 75. This type of valve is well known. The admission of air through the pipe 74 into the space between its diaphragms 64 and 65 cause the diaphragms to bend oppositely. They are stopped by engagement with their adjacent walls. The upward movement of the diaphragm 64 performs no useful work. The downward movement of the companion diaphragm 65 on the contrary acts upon the head of the valve stem to close the valve, which is normally open, as indicated in Fig. 1. This cuts off the supply of steam to the heat exchanger steam inlet 76 from the pipe 77, as will be apparent. It will be the expansion of the fluid within the bulb 51 that causes the Bourdon spring to open the valve 70. This will mean that when the temperature of the juice exceeds a given amount, then the valve 75 operates to close the steam passage between the pipe 77 and the inlet 76 and will cause the heat exchanger to provide less heat for exchange into the heat of the juice. When the temperature drops and the valve 70 closes, then the spring 78 within the diaphragm valve 75 will operate to open the valve.

The electro-pneumatic controls J include connections between the electrodes 61 and 62 and an electromagnetic switch 79 and a solenoid valve 80. When the liquid rises sufficiently, it closes a circuit between the two electrodes 61, 62. When the liquid within the tube 60 falls below the critical level, then the circuit is broken at the electrodes and the switch 79 is deenergized and the solenoid valve 80 falls back to its initial position.

The energization of the electromagnet of the switch 79 opens the operating circuit of the electric motor 81 and so stops the pump. When the level within the tube 60 falls, the reverse operation will occur and the pump will be again started. Likewise, the energization of the solenoid winding 82 will actuate the valve 80 to cut off the supply of juice by closing the valve 11. The reverse operation will occur when the solenoid winding is deenergized.

Tracing out these operations in detail, the switch 79 is supplied with current from supply leads 83, 84. The switch 85 is normally closed by a spring 86, but when the electromagnet is energized it is opened. Consequently, the motor 81 has its current cut off. Similarly, the winding 82 of solenoid valve 80 is supplied with current from the supply leads 87, 88, which are connected thereto through a hand-operated switch 89 which is normally in closed position. The drawing up of the solenoid core 90 changes the pneumatic connections of the valve, as we shall see presently.

The connections by which these two electromagnetic devices are operated, include a pair of leads 91 and parallel leads 92 and 93, the former running to switch 79, and the latter to valve 80. In Fig. 2, these connecting wires are not shown, but the connection is indicated in the case of the switch 79 by the dot-and-dash line 94, and in the case of the solenoid valve by the dot-and-dash line 95. Likewise, in Fig. 5, the former is indicated by the dot-and-dash line 96, and the latter by the dot-and-dash line 97.

When the juice reaches an elevation to close circuit between the contacts 61 and 62, the effect is, amongst other things, to cut down the supply of juice through the mechanism A to the condenser B. This is done through the agency of the solenoid valve which, when its winding 82 is deenergized, leaves the valve 11 in its open position, as illustrated, supplying juice to the condenser B. When the winding 82 has its circuit completed, on the other hand, it actuates the diaphragm of the valve against its normal spring pressure through the agency of compressed air admitted from pipe 100 into the chamber 101 and thence out through pipe 102 to the upper face of the diaphragm. The pressure is such as to overcome the pressure of the spring and so close the valve 11. Meanwhile the exhaust connection through nipple 103 is closed. The proper positioning of the valve lever 104, pivoted at 105, is brought about by the movements of the valve core 90. The solenoid valve is of well known construction and need not be further described.

In addition to cutting off the supply of juice, the energizing of the winding 82 of the solenoid valve also cuts off the steam supplied to the heat exchanger D. As we have seen, when energized, it supplies compressed air to the pipe connection 102 and thence to the pipe 111, which connects with the upper side of the double diaphragm valve 75 which controls the main steam supply to the heat exchanger. The admission of compressed air to the upper side of diaphragm 64 causes the same to bend down into engagement with the diaphragm 65 and carry the latter with it down against the head of the valve stem to close the valve 75 and thus cut off the supply of steam. At the same time, compressed air is supplied through the pipe 112 to the upper side of the diaphragm of a diaphragm valve 113, and the operation of the valve resulting therefrom opens the pipe connection 114 and thereby vents the steam flow to atmosphere.

It may be noted at this point that when the diaphragm valve 75 is operated by air pressure coming from the temperature controls H, the air pressure also operates the valve 113 to vent the steam flow.

The result of these various operations is to stop the supply of juice and the supply of steam to the heat exchanger. Ordinarily, the juice level may be located approximately at the level indicated by the line 116. This will be during normal operation. The level of the juice in the collector F will be raised in case the filling machine is stopped.

The discharge pump G is preferably a centrifugal pump driven by a directly connected electric motor 117. Being centrifugal it requires no special controls. It may be started and stopped by the operation of any usual control apparatus.

It may be noted that the heat exchanger is provided with a pipe 119 for the condensate, which pipe leads to a steam trap 120 which has a discharge outlet 121, as is usual. A discharge pipe 122, for non-condensible gases, controlled by a valve 123, is also provided on the under side of the shell 33 of the heat exchanger D.

Steam may be supplied through the usual steam pump 126, provided with a globe valve 127, a filter 128, and a diaphragm-operated valve 129. This valve as its associated instruments is of well known construction. It is an air-operated steam pressure controller. It comprises a central dial instrument 130, an air pressure gauge 131, and a steam gauge 132. In itself it forms no part of the present invention and so will not be further described. Compressed air is supplied through pipe 133, and steam passes through the surge drum 137 and connected pipe 138. A by-pass 139 is provided with a valve 140 for hand operation. By the use of these means, the steam pressure is nicely regulated.

Compressed air of suitable pressure is supplied through a pipe 141 which is provided with a filter 142 and a pressure regulator 143. A connection of the supply pipe 141 with the air pipes 71, 100, 133, occurs at the junction point 144. Thus, compressed air is supplied for each of the pneumatic operations previously outlined.

The degree of vacuum in the chamber B is regulated through the agency of an eductor K and an associated valve 146. It is true that the condensation within the chamber B—F produces a vacuum, but the eductor and valve not only remove the non-condensibles but control the degree of vacuum to a nicety.

It is to be noted that these elements in removing the non-condensibles remove large quantities of air. Thus the mechanism becomes a highly efficient deaerator as well as performing its other functions. The evaporation of the juice from 260° Fahr. to 200° Fahr. causes this deaeration. A certain amount is boiled out and the air with it.

The eductor K and its associated valve may be variously formed. Thus, in the present instance, the eductor is supplied with steam through a small steam pipe 147 controlled by a valve 148, and the admission of steam at the Venturi passage 149 withdraws air from the chamber B through the pipe 150 and thus produces a vacuum within the pipe by reason of the flow of steam which exhausts through pipe 151. This eductor K is of larger capacity than is required to maintain the vacuum at the desired point. It therefore, if left to itself, would produce a greater vacuum in the chamber B than is desired. Hence the valve 146 is employed. This is a relief valve which, by means of spring pressure, tends to move the valve proper 152 in one direction, and the vacuum on the under side tends to move it in the opposite direction. Openings 153 in the wall of the valve allow air to pass into the pipe 150 and thence into the chamber B whenever that pressure becomes too small to be balanced by the spring 154 of the device. A set screw 155, threaded through the top of the casing, regulates the setting of the relief valve.

The relief valve L is shown in detail in Fig. 4. It may be of any usual construction and in the present instance comprises a casing 158 having a valve 159 proper, which is forced into closing position by a spring 160. This is counteracted by the pressure of the juice in the pipe 49. The tension of the spring 160 may be regulated by turning the sleeve 161 and setting it by a nut 162. The nut is held from movement by an outwardly extending shoulder 163 which is held in place by a cap nut 164. From this description, it will be seen that when the pressure in the pipe 49 reaches an amount sufficient to overcome the compression of the spring 160, it will pass out through pipe 50 into the collecting chamber F. Thus a higher pressure is obtainable within the connections E and greater efficiency in condensing is obtainable with the apparatus equipped with a relief valve than would be obtainable without it.

Coming now to a consideration of the temperature control device (see Fig. 7) which is intended to be used in the place of the relatively crude device H of Fig. 1, it will be noted that the Bourdon tube 69 is secured at one end to a fixed support 165, and at its other end to a movable support 166. Upon expansion of the tube 69, the member 166 acts through link 167 to move the pointer 168 about its pivot 169. For careful adjustment, the member 166 and link 167 are adjustably connected, as indicated at 170. Markings 171 upon a fixed member 172 cooperate with the pointer 168 to indicate the degree of setting. Assuming that the parts are shown in the full line connected position, then it will be apparent that as the lower end of the pointer 168 is moved to the left about the pivot 169, and thereby draws upon the link 173, it will rock the lever 174 about the pivot 175 at its upper end and thereby shift the baffle 176 by reason of the engagement of a pin 177 upon the lever 174 extending into proximity to the lower end of the baffle 176. The return of the baffle 176 is controlled by a spring 178 attached to the lower end of the baffle and to a fixed pin upon the frame 179. This frame is in a way the fixed support for the upright 180 and the outwardly extending arm to which the baffle 176 is secured. Adjustments of the supporting frame 179 may be obtained by rotating the adjusting screws 182 and 183. The latter cooperates with a rack 184 upon the lower end of a projection 185. These parts are secured vertically by means of screws 186.

The outlet 189, secured to a block 190 which carries the interconnecting tube 191, connects at its opposite end to a block 192. In this block 192, are indicated the air supply passage 74 and the outlet passage 71, together with appropriate interconnecting passages as indicated. A screw 193 closes the normally open end of the passage 74. The passage 71 connects with a lateral passage 194 controled by a suitably apertured screw 195 screwed into the block 192. Similarly, the upper end of passage 71 and the end of passage 196 is interconnected by a suitably apertured screw 197. Cooperating with these openings, is a ball valve 198. This valve is controlled by a bellows 199.

When the temperature is to be throttled at the control point of 260° Fahr., the air supply, which enters the block 192 by way of pipe 74, bleeds through orifice 200 into the pipe 191 and partially escapes through the larger orifice 189 in the nozzle structure of the block 190. The rate at which the air escapes through the orifice 189 is controlled by the nearness of the baffle 176 which in turn is determined by the relative position of control lever 174 and adjusted lever 180; in other words, by the relation of the indicating pointer to the control point. So long as the control point is maintained, the escape of air through the outlet 189 is at a constant rate. Bellows 199 remains correspondingly deflated and air valve ball 198 is supported in some mid-position which throttles the flow of compressed air from the pipe 74 to the pipe 71.

Any tendency of the temperature to exceed the control point of 260° Fahr. will cause the Bourdon spring 69 to uncoil proportionately and its movement will be transmitted, as before explained, to the pointer 168 and, by the link 173, to the control lever 174. The pin 177, which is attached to the lever 174 and is in contact with the lower end of the baffle 176, then moves the upper end of the baffle farther away from the nozzle 189. This permits a greater escape of air through the orifice, which in turn further deflates bellows 199 and lowers the air valve ball 198 so that a proportionate increase in air pressure via pipe 71 is applied to the diaphragm of the main valve 75. The flow of steam through the main valve 75 then will be sufficiently decreased to return the apparatus temperature to the control point.

A decrease in the temperature would cause an opposite action of the control system.

The several diaphragm valves 11, 75, 113, the steam pressure controller 129, 130, 131 and the temperature controller, known to the trade as the "Fullscope," shown in Fig. 7, are all Taylor products, put out by the Taylor Instrument Companies, of Rochester, New York. Of course, any suitable equivalent devices may be used in the relations shown.

From this description, it wil be seen that I have provided a path for the flow of juice from the inlet connections A through the condenser B to its outlet 20, then through pipe 29, pump C, and pipe 30 to the intake 31 of the high speed heat exchanger D, then after passing through the latter to the outlet 43, through the interconnecting pipes E controlled by the pressure controller L on to the intake 50 of the collecting chamber F, and then through that chamber and out through pump G and the pipes 67, 68 to the canning machine. While passing through the heat exchanger, the temperature of the juice is heated to a high degree, thus, in the case of tomato juice, to about 260° Fahr., from an entering temperature of about 130° Fahr. This is done quickly. It is known as flash heating or flash pasteurization. Upon entering the chamber F which has a relatively large volume, it suddenly expands and gives up its heat. The resulting liquid and vapor is thereupon separated. The vapor rises up through the condensing chamber B where it meets the incoming juice and increases its normal temperature of, say, 70° Fahr. to 130° Fahr. or thereabouts. The separated liquid drops to the bottom of the tank F and is there withdrawn by the pump G, as before noted. If tomato juice, it then has a temperature of approximately 200° Fahr., a temperature suitable for canning. It will be noted that the chamber B—F is vacuumized by the eductor K and its associated relief valve 146. The vacuumizing produced by these elements carries off the non-condensibles. The result of their use is to carry away large quantities of air, so deaerating the collected juice. The relief valve L, which is in fact a pressure regulator, maintains the juice at the high pressure and temperature at which it emerges from the heat exchanger. Thus its pressure and temperature are kept at a high point until released into the vacuum of the chamber F.

The thumbnail sketch of Fig. 8 shows the two chambers reversed, the collecting and separating chamber F' being above and the condenser B' below. The arrangement of the weir 15' and of the central tube 18' is somewhat different than the arrangement of the other figures. The juice enters at 14 and spills over the upper edge of the weir 15' and falls upon the outwardly extending flange 201 formed at the bottom of the central tube 18' which is supported by the diaphragm 19 as before. It then leaves the chamber B' through the exit opening 20 and is heated in the heat exchanger D as before and is then injected into the separating chamber F' through the supply inlet 50. As it enters the chamber F', it is explosively expanded with a corresponding drop in temperature. This results in the collection of the liquid in the bottom of the chamber around the central tube 18' where it is drawn off through the opening 56. Large amounts of vapor are freed at the same time. This vapor passes down through the tube 18' where it encounters the incoming fresh juice flowing over the weir 15', passing through the stream twice. The result is a preheating of the juice. The same temperatures result as in the preferred form. The eductor K and valve 146 are connected to the pipe 150.

It will be apparent that a different pasteurizing equipment may be used than that shown; consequently, I have termed the inlet 50 a pasteurizing juice inlet in certain claims. Similarly, other changes and substitutions may be made without departing from the spirit of the invention. I therefore aim to cover by the terms of the appended claims all such alterations and modifications as rightly come within the invention.

I claim:

1. In apparatus of the class described, the combination of a vacuum chamber, a liquid supply inlet and a liquid outlet for said chamber, means for vacuumizing said chamber, a high speed heat exchanger, an inlet and an outlet for said exchanger, a pump located between the chamber outlet and the exchanger inlet and operative to force the liquid being treated quickly through the exchanger, means for supplying heat to said exchanger, conduit means between said exchanger outlet and said chamber, a pressure regulator in said conduit means for maintaining the high presure of the heated liquid delivered by said exchanger to said conduit means until about to enter said chamber, means in said chamber for bringing the vapors flashed from the heated liquid into contact with the incoming low temperature liquid to heat the latter in its passage through said chamber, and means for removing the liquid product from said chamber.

2. In apparatus of the class described, the combination of a vacuum chamber, a liquid supply inlet near the top of said chamber, a weir in said chamber having a spillway over which the incoming liquid passes, a diaphragm in said chamber below said weir dividing said chamber into an upper part and a lower part, a tubular passageway extending upward from said diaphragm into said upper part and establishing communication between the two parts, a hood open at its bottom and overlying said tubular passageway, vacuumizing means communicating with said chamber above said weir, an outlet from the upper part of said chamber at a point just above said diaphragm, a high speed heat exchanger, an inlet and an outlet for said exchanger, a pump located between the chamber outlet and the exchanger inlet and operative to force the liquid being treated quickly through the exchanger, means for supplying heat to said exchanger, conduit means between said exchanger outlet and the lower portion of said chamber, a pressure regulator in said conduit means for maintaining the high pressure of the heated liquid in said conduit means until it is about to enter said chamber, and means for removing the liquid product from the lower part, whereby vapors flashed from the heated liquid are caused to pass upward through said tubular passage and into contact with the low temperature liquid flowing over said weir to preheat said liquid.

3. In apparatus of the class described, the combination of a vacuum chamber, a liquid supply inlet near the top of the chamber, a weir in said chamber having a spillway over which the incoming liquid passes, a diaphragm in said chamber below said weir dividing said chamber into an upper part and a lower part, a tubular passageway extending upward from said diaphragm into said upper part and establishing communication between the two parts, a hood open at its bottom and overlying said tubular passageway and providing communication between said parts, vacuumizing means communicating with said chamber above said weir, an outlet from the upper part of said chamber at a point just above said diaphragm, an inlet to the lower part of said chamber at a point just below said diaphragm, flash pasteurizing means taking the liquid from said outlet just above said diaphragm and after pasteurizing it passing it on to the chamber by way of the inlet just below said diaphragm, and means for removing the liquid product from the lower part of said chamber.

4. In apparatus of the class described, the combination of a vacuum chamber, a liquid supply inlet near the top of the chamber, a weir in said chamber having a spillway over which the incoming liquid passes, a diaphragm in said chamber below said weir dividing said chamber into an upper part and a lower part, a tubular passageway extending upward from said diaphragm into said upper part and establishing communication between the two parts, a hood open at its bottom and overlying said tubular passageway and providing communication between said parts, an eductor and associated relief valve communicating with the top of said chamber above said weir for drawing off non-condensibles, an outlet from the upper part of said chamber at a point just above said diaphragm, an inlet to the lower part of said chamber at a point just below said diaphragm, flash pasteurizing means taking the liquid from said outlet just above said diaphragm and after pasteurizing it passing it on to the chamber by way of the inlet just below said diaphragm, and means for removing the liquid product from the lower part of said chamber.

5. In apparatus of the class described, the combination of a vacuum chamber, a liquid supply inlet to said chamber, means in said chamber for fanning out the liquid admitted through said inlet, means for vacuumizing said chamber, diaphragm means for dividing said chamber into an upper part and a lower part, a tubular passageway therebetween, an outlet from the upper part of said chamber communicating therewith at a point just above said diaphragm means, a pasteurized liquid inlet to the lower part of said chamber communicating therewith at a point just below said diaphragm means, flash pasteurizing means taking the liquid from said outlet just above said diaphragm means and after pasteurizing it passing it on to the lower part of said chamber through said pasteurized liquid inlet whereby the gases resulting from said quick pasteurization pass through said tubular passageway into engagement with the fanned out incoming liquid to preheat it, and means for removing the liquid product from the lower portion of said chamber.

6. In apparatus of the class described, the combination of a vacuum chamber, a liquid supply inlet to said chamber, means in said chamber for fanning out the juice admitted through said inlet, an aductor and associated relief valve communicating with said chamber above said fanning means to vacuumize said chamber to carry off the non-condensibles, diaphragm means for dividing said chamber into an upper part and a lower part, a tubular passageway therebetween, an outlet from the upper part of said chamber communicating therewith at a point just above said diaphragm means, a pasteurized liquid inlet to the lower part of said chamber communicating therewith at a point just below said diaphragm means, flash pasteurizing means taking the juice from said outlet just above said diaphragm means and after pasteurizing it passing it on to the lower part of said chamber through said pasteurized liquid inlet whereby the gases resulting from said quick pasteurization pass through said tubular pasageway into engagement with the fanned out incoming liquid to preheat it, and means for removing the liquid product from the lower portion of said chamber.

7. In apparatus of the class described, the combination of a vacuum chamber divided by an apertured diaphragm into an upper condensing portion and a lower vapor-separating portion, a liquid inlet entering the upper portion near the top, a liquid outlet from said upper portion adjacent to said diaphragm, a similar inlet near the top of the lower portion adjacent to said diaphragm, a product outlet near the bottom of said lower portion, flash pasteurizing means for taking the liquid from said upper portion outlet and after pasteurizing it passing it on to said lower portion through said inlet to that portion, the vapor-liquid mixture upon entering the lower portion of said chamber separating, the liquid dropping to the bottom and the vapor ascending through said aperture, and condensing means within said upper condensing portion and serving to condense the vapors therein by the cooler incoming liquid.

8. In apparatus of the class described, the combination of a vacuum chamber, a liquid supply inlet near the top of said chamber, a weir in said chamber having a spillway over which the incoming liquid passes, a diaphragm in said chamber below said weir dividing said chamber into an upper condensing part and a lower separating part, a tubular pasageway extending upward from such diaphragm into the condensing part and establishing communication between the two parts, a hood open at its bottom and overlying said tubular passageway, vacuumizing means communicating with said chamber above said weir for drawing off the non-condensibles, an outlet from said upper condensing part entering said chamber at a point just above said diaphragm, an inlet to the lower separating part entering said chamber just below said diaphragm, an outlet near the bottom of said separating part, a flash pasteurizer operating to take liquid from said upper part outlet and delivering it to said lower part inlet, a control valve for cutting off said liquid supply, and means for operating it in accordance with the liquid level.

9. In apparatus of the class described, the combination of a vacuum chamber, a liquid supply inlet and a liquid outlet for said chamber, means for vacuumizing said chamber, a high speed heat exchanger, an inlet and an outlet for said exchanger, an electrically driven pump between the chamber outlet and the exchanger inlet and operative to force liquid quickly through the exchanger, means for supplying heat to said exchanger, conduit means between said exchanger outlet and said chamber, a pressure regulator in said conduit means for maintaining the high pressure of the heated liquid in said conduit means until it is about to enter the vacuum in said chamber, means in said chamber for bringing the vapors flashed from the heated liquid into contact with the incoming low temperature liquid to heat the latter in its passage through said chamber, means for removing the liquid product from the lower portion of said chamber, and means for regulating the heat supplying means in accordance with the temperature of the liquid at the outlet end of the heat exchanger.

10. In apparatus of the class described, the combination of a vacuum chamber, a liquid supply inlet and a liquid outlet for said chamber, means for vacuumizing said chamber, a high speed heat exchanger, an inlet and an outlet for said exchanger, an electrically driven pump between the chamber outlet and the exchanger inlet and operative to force the liquid being treated quickly through the exchanger, means for supplying heat to said exchanger, conduit means between said exchanger outlet and said chamber, a pressure regulator in said conduit means for maintaining the high pressure of the heated liquid in said conduit means until it is about to enter the vacuum in said chamber, means in said chamber for bringing the vapors flashed from the heated liquid into contact with the incoming low temperature liquid to heat the latter in its passage through said chamber, means for removing the liquid product from the lower portion of said chamber, means for regulating the heat supplying means in accordance with the temperature of the liquid at the outlet end of the heat exchanger, and means for stopping said supply of heat, said electrically driven pump and said supply of liquid to said chamber, all in response to a limit in the rise of liquid product beyond a given level.

11. In apparatus of the class described, the combination of a first chamber, a first chamber inlet and outlet, a second chamber, a second chamber inlet and outlet, a weir in said first chamber for cascading the liquid received through said first chamber inlet, a tubular passageway between said first and second chambers projecting well into said first chamber, vacuumizing means for said chambers connected to the first chamber, a high speed heat exchanger, an inlet and an outlet for said heat exchanger, a pump located between the first chamber outlet and the exchanger inlet and operative to force the liquid being treated quickly through the exchanger, means for supplying heat to said exchanger, conduit means between said exchanger outlet and said second chamber inlet, a pressure regulator in said conduit means for maintaining the high pressure of the heated liquid in said conduit means until it is about to enter said chamber, and means for removing the liquid product from said second chamber outlet, whereby vapors flashed from the heated liquid are caused to pass from said second chamber through said tubular passageway into said first chamber and into contact with the low temperature liquid flowing over said weir to preheat the said liquid.

12. In apparatus of the class described, the combination of a first chamber, a first chamber inlet and outlet, a second chamber, a second chamber inlet and outlet, means in said first chamber for fanning out the liquid admitted through said first chamber inlet, means for vacuumizing said chambers connected with said first chamber, a tubular passageway between said chambers projecting into said first chamber, and flash pasteurizing means taking the liquid from said first chamber outlet and after pasteurizing it passing it on to said second chamber inlet whereby the gases resulting from said quick pasteurization pass through said tubular passageway into engagement with the fanned out incoming liquid to preheat it.

13. In apparatus of the class described, the combination of a first chamber, a first chamber inlet and outlet, a second chamber, a second chamber inlet and outlet, a weir in said first chamber having a spillway over which the incoming liquid passes, a tubular passageway between said chambers and extending into the first chamber, vacuumizing means communicating with said first chamber adjacent to said weir for drawing off the non-condensibles, a pasteurizer operating to take liquid from the first chamber outlet and to deliver it to the second chamber inlet, a cut-off valve associated with said first chamber inlet, and means operating in accordance with the liquid level in the second chamber to actuate said cut-off valve.

14. In apparatus of the class described, for treating liquids, the combination of a first chamber, a first chamber inlet and outlet, a second chamber, a second chamber inlet and outlet, means in said first chamber for fanning out the liquid admitted through said first chamber inlet, a tubular passageway between said chambers and extending into said first chamber, vacuumizing means communicating with said first chamber, flash pasteurizing means taking the liquid under treatment from said first chamber outlet and after pasteurizing it passing it on to said second chamber by way of said second chamber inlet, a cut-off valve associated with said first chamber inlet, means operating in accordance with the liquid level in the second chamber to actuate said cut-off valve, and means for removing the liquid product from said second chamber.

15. In apparatus of the class described, the combination of a vacuumized chamber, means for flowing a stream of liquid to be treated through said chamber, means including a heat exchanger for giving the liquid received from said chamber a temperature of relatively high degree, means including a second vacuumized chamber for receiving said heated liquid from said heat exchanger, to flash evaporate it in said second chamber, means for removing the liquid product from said second chamber, and means for causing the heat of the vapor resulting from said flash evaporation to be absorbed by the oncoming stream of lower temperature liquid as it passes through said first mentioned chamber.

16. In apparatus of the class described, the combination of a vacuumized chamber, means for flowing a stream of liquid to be treated through said chamber, means including a heat exchanger for increasing the temperature of the liquid received from said chamber, from approximately 130° F. to approximately 260° F., means including a second vacuumized chamber for quickly reducing the temperature from approximately 260° F. to approximately 200° F. by flash evaporation, means for removing said liquid product from said second chamber, and means for directing the vapor resulting from said flash evaporation into said first mentioned chamber to preheat the oncoming stream of liquid up to approximately 130° F.

17. Apparatus for continuously heat treating flowable comestibles of the type including tomato juice, which includes a heat exchanger for receiving the incoming comestible, means to disperse the flow of said comestible in the heat exchanger thereby obtaining a great heat exchange surface, said heat exchanger having an inlet for directing hot vapors obtained from the subsequent evaporative cooling of said comestible into said dispersion whereby the temperature of the comestible is quickly raised, means reducing the pressure in said vessel, pump means arranged to withdraw said heated comestible from said heat exchanger at a rate commensurate with its average flow into said heat exchanger, a second heat exchanger connected to receive the comestible from said pump means and adapted to heat the comestible to a temperature sufficient to sterilize the comestible, evaporative cooling means in which the comestible is cooled connected to receive the comestible from the second mentioned heat exchanger, and duct means connecting the cooling means and the first mentioned heat exchanger to conduct vapors from the cooling means to the first mentioned heat exchanger, whereby volatile constituents of said comestible are returned to the incoming comestible and condensed therein and the comestible is heated by the vapors.

JOS. A. CROSS.

REFERENCES CITED

The following references are of record in the file of this patent:

UNITED STATES PATENTS

| Number | Name | Date |
| --- | --- | --- |
| 2,126,552 | Holloway | Aug. 9, 1938 |
| 2,361,695 | Lizeray | Oct. 31, 1944 |